(12) United States Patent
Comeau et al.

(10) Patent No.: US 9,938,394 B2
(45) Date of Patent: Apr. 10, 2018

(54) GOLF BALL LAYERS INCLUDING A FATTY ACID (METH)ACRYLIC ACID SALT

(71) Applicant: Acushnet Company, Fairhaven, MA (US)

(72) Inventors: Brian Comeau, Berkley, MA (US); Michael J. Sullivan, Old Lyme, CT (US); Mark L. Binette, Mattapoisett, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 15/196,268

(22) Filed: Jun. 29, 2016

(65) Prior Publication Data

US 2018/0002510 A1 Jan. 4, 2018

(51) Int. Cl.
| | | |
|---|---|---|
| *C08K 5/098* | (2006.01) | |
| *A63B 37/02* | (2006.01) | |
| *C08K 5/14* | (2006.01) | |
| *C08L 23/08* | (2006.01) | |
| *C08L 9/00* | (2006.01) | |
| *A63B 37/00* | (2006.01) | |

(52) U.S. Cl.
CPC .......... *C08K 5/098* (2013.01); *A63B 37/0039* (2013.01); *A63B 37/0043* (2013.01); *A63B 37/0075* (2013.01); *C08K 5/14* (2013.01); *C08L 9/00* (2013.01); *C08L 23/0876* (2013.01); *C08L 2205/06* (2013.01)

(58) Field of Classification Search
CPC .. C08K 5/0016; C08K 5/0025; C08K 5/0098; C08K 5/09; C08K 5/0091; A63B 37/0039; A63B 37/0043; A63B 37/0075; C08L 9/00; C08L 2205/06
See application file for complete search history.

(56) References Cited

U.S. PATENT DOCUMENTS

| | | | | |
|---|---|---|---|---|
| 5,834,546 A | * | 11/1998 | Harris | .......... A63B 37/06 473/357 |
| 2002/0086746 A1 | * | 7/2002 | Bellinger | .......... A63B 37/0003 473/374 |
| 2003/0120098 A1 | * | 6/2003 | Higuchi | .......... C07C 51/412 556/131 |
| 2004/0152540 A1 | * | 8/2004 | Fushihara | .......... A63B 37/0003 473/371 |

(Continued)

OTHER PUBLICATIONS

Dalton, Jeff, "Compression by Any Other Name", Science and Golf IV, Proceedings of the World Scientific Congress of Golf (Eric Thain ed., Routledge, 2002).

*Primary Examiner* — John E Simms, Jr.
(74) *Attorney, Agent, or Firm* — Mandi B. Milbank

(57) ABSTRACT

The present invention relates to the use of a fatty acid (meth)acrylic acid salt in a golf ball layer. The fatty acid (meth)acrylic acid salt may be added to one or more portions of a golf ball including a core, intermediate, or cover layer. For example, in one embodiment, the fatty acid (meth) acrylic acid salt may be blended with a polybutadiene rubber material. In another embodiment, the fatty acid (meth) acrylic acid salt of the present invention may be blended with an ionomer. In some embodiments, the fatty acid (meth)acrylic acid salt may be blended with a formulation including both a polybutadiene rubber component and an ionomer.

20 Claims, 1 Drawing Sheet

(56) References Cited

U.S. PATENT DOCUMENTS

| | | | |
|---|---|---|---|
| 2005/0059793 A1* | 3/2005 | Lutz | C08L 75/16 |
| | | | 528/75 |
| 2013/0324316 A1* | 12/2013 | Isogawa | A63B 37/0054 |
| | | | 473/373 |
| 2014/0099271 A1 | 4/2014 | Craig | |
| 2014/0235779 A1* | 8/2014 | Goss, Jr. | C08J 3/20 |
| | | | 524/399 |

* cited by examiner

GOLF BALL LAYERS INCLUDING A FATTY ACID (METH)ACRYLIC ACID SALT

FIELD OF THE INVENTION

The present invention relates to golf balls, and more particularly, to golf balls including at least one layer formed from a composition including a fatty acid (meth)acrylic acid salt. In particular, the present invention contemplates a rubber-based core composition including a fatty acid (meth) acrylic acid salt that is incorporated into a golf ball. The present invention also contemplates an ionomeric composition including a fatty acid (meth)acrylic acid salt that is incorporated into a golf ball as an intermediate layer or cover layer.

BACKGROUND OF THE INVENTION

Golf ball manufacturers routinely experiment with different materials in an effort, to impart specific properties and features to the balls and/or individual components/layers within the ball. For example, the resiliency and rebounding performance of the golf ball is based primarily on the core of the ball. Thus, the core is commonly made of a rubber material such as natural and synthetic rubbers, styrene butadiene, polybutadiene, poly(cis-isoprene), poly(trans-isoprene), or highly neutralized acid copolymers. However, the durability required for repetitive play is often based on the cover of the ball. Because of their toughness and durability, the cover is commonly made of ionomer resins, polyamides, polyesters, polyurethanes, or polyureas.

While these materials are commonly used in golf balls, polybutadiene rubber core compositions and ionomeric core/cover compositions have room for improvement in terms of performance and durability. For instance, polybutadiene rubbers of high molecular weight have better resilience than polybutadiene rubbers of low molecular weight. However, as the molecular weight of the polybutadiene rubber increases, the milling and processing properties of the polybutadiene rubber deteriorate. Similarly, while ionomer resins are more durable than other types of golf ball layer materials, the same properties that result in durability also provide a hard "feel" and generally result in a lower spin rate and, thus, lower control, due to the hardness of the material.

Accordingly, there remains a need in the golf ball manufacturing art to provide compositions with improved properties and processability that are useful in golf ball components. Advantageously, the blends of the present invention provide golf ball compositions having superior physical properties, as well as better processability, mold release, and moisture insensitivity characteristics.

SUMMARY OF THE INVENTION

The present invention is directed to a golf ball including a cover, a core, and an intermediate layer disposed between the cover and the core, where the core includes: a blend of a polybutadiene rubber and a fatty acid (meth)acrylic acid salt, where the fatty acid (meth) acrylic acid salt includes the reaction product of a fatty acid, a (meth)acrylic acid monomer, and $M(OH)_x$ or $M_xO_y$, where M is a metal cation and x and y independently range from about 1 to about 7, and where the fatty acid (meth)acrylic acid salt is present in the blend in an amount of about 1 phr to about 70 phr.

In this aspect of the present invention, the fatty acid (meth)acrylic acid salt includes stearic acid or oleic acid. The blend may also include a coagent selected from zinc diacrylate, zinc oxide, a fatty acid, a fatty acid salt, or combinations thereof. In one embodiment, the fatty acid includes at least 4 carbon atoms. In another embodiment, the fatty acid (meth)acrylic acid salt is present in the blend in an amount of about 10 phr to about 50 phr. In yet another embodiment, the core has a hardness of about 70 Shore C to about 85 Shore C.

The present invention is also directed to a golf ball including a core and a cover disposed about the core, wherein the cover includes: a blend of an ionomer resin and a fatty acid (meth)acrylic acid salt, wherein the fatty acid (meth)acrylic acid salt includes the reaction product of a fatty acid, a (meth)acrylic acid monomer, and a $M(OH)_x$ or $M_xO_y$, where M is a metal cation and x and y independently range from about 1 to about 7, and where the fatty acid (meth)acrylic acid salt is present in the blend in an amount of about 1 weight percent to about 50 weight percent.

In this aspect of the present invention, the ionomer resin is an E/X/Y copolymer, wherein E is ethylene; X is a $C_{3-8}$ α, β-ethylenically unsaturated carboxylic acid; and Y is a softening monomer. In one embodiment, the copolymer includes ethylene/(meth)acrylic acid/n-butyl acrylate, ethylene/(meth)acrylic acid/methyl acrylate, ethylene/(meth) acrylic acid/ethyl acrylate, ethylene/(meth)acrylic acid/ isobutyl acrylate, or combinations thereof. In another embodiment, the ionomer resin includes acid groups that are neutralized greater than about 80 percent. The blend may also further include a metal cation source, as well as a crosslinking initiator selected from peroxides, high energy radiation sources capable of generating free radicals, or combinations thereof.

In one embodiment, the fatty acid (meth)acrylic acid salt is present in the blend in an amount of about 2 weight percent to about 40 weight percent. In another embodiment, the fatty acid (meth)acrylic acid salt includes about 5 to about 28 carbon atoms. In yet another embodiment, the cover has a hardness of about 60 Shore D or less.

The present invention is further directed to a golf ball comprising a core, an intermediate layer disposed about the core, and a cover disposed about the intermediate layer, wherein the intermediate layer includes: a blend of a poly butadiene rubber in an amount of about 5 weight percent to about 90 weight percent, an ionomer resin in an amount of about 5 weight percent to about 90 weight percent, and a fatty acid (meth)acrylic acid salt in an amount of about 1 weight percent to about 50 weight percent. In one embodiment, the fatty acid (meth)acrylic acid salt includes the reaction product of a fatty acid, a (meth)acrylic acid monomer, and $M(OH)_x$ or $M_xO_y$, where M is a metal cation and x and y independently range from about 1 to about 7. In another embodiment, the fatty acid (meth)acrylic acid salt is present in the blend in an amount of about 10 weight percent to about 40 weight percent. In yet another embodiment, the intermediate layer has a hardness of about 70 Shore C to about 85 Shore C.

BRIEF DESCRIPTION OF THE DRAWINGS

Further features and advantages of the invention can be ascertained from the following detailed description that is provided in connection with the drawing(s) described below.

DETAILED DESCRIPTION OF THE INVENTION

Figure 1:
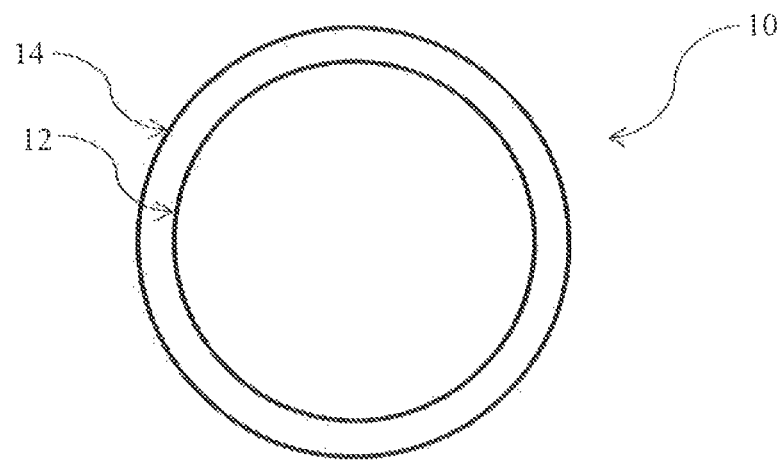
FIG. 1 illustrates a cross-section of a two-piece golf ball in accordance with an embodiment of the invention.

The present invention is directed to the use of a fatty acid (meth)acrylic acid salt in a golf ball layer. As used herein, the term "(meth)acrylate" includes both acrylate and methacrylate. The fatty acid (meth)acrylic acid salt may be added to a composition ultimately used to form at least one layer of a golf ball including a core, intermediate, or cover layer. For example, in one embodiment, the fatty acid (meth)acrylic acid salt may be blended with a polybutadiene rubber material used to form a golf ball core. In another embodiment, the fatty acid (meth)acrylic acid salt of the present invention may be blended with an ionomer to form an intermediate layer or cover layer. In some embodiments, the fatty acid (meth)acrylic acid salt may be blended with a formulation including both a polybutadiene rubber component and an ionomer and used to form a layer of a golf ball.

Finished golf balls incorporating such layers demonstrate numerous advantageous properties. Without being bound to any particular theory, it has been found that the fatty acid (meth)acrylic acid salt combines the properties of a fatty acid/fatty acid salt with those of metal (meth)acrylates. Specifically, the (meth)acrylate metal salt aspect of the fatty acid (meth)acrylic acid salt contributes qualities such as increased stiffness, hardness, and abrasion resistance, while the fatty acids and fatty acid salts help to make the composition more processable. Thus, when the fatty acid (meth)acrylic acid salt is added to a composition used to form a golf ball layer, the resulting golf balls demonstrate superior physical properties, as well as better processability, mold release, and moisture insensitivity characteristics.

The Fatty Acid (Meth)acrylic Acid Salt

The present invention contemplates the use of a fatty acid (meth)acrylic acid salt. The fatty acid (meth)acrylic acid salts of the present invention include any fatty acid (meth)acrylic acid salts that are the reaction product of a fatty acid, a (meth)acrylic acid monomer, and a basic compound such as metal oxide, carbonate, or hydroxide.

The fatty acids contemplated by the present invention are carboxylic acids with an alkyl chain that is either saturated or unsaturated. Suitable fatty acids contemplated for use in making the fatty acid (meth)acrylic acid salts of the present invention include, but are not limited to, saturated or unsaturated fatty acids having a carbon chain length of about 4 to about 26. In some embodiments, the fatty acid may also have a carbon chain length of greater than 26. In this regard, the fatty acid may have the following general formula:

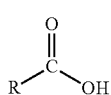

where R is a straight or branched, saturated or unsaturated, carbon chain having at least 3 carbon atoms.

Examples of saturated fatty acids, i.e., fatty acids in which the carbon atoms of the alkyl chain are connected by single bonds, contemplated for use in the present invention include, but are not limited to, butyric acid, valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, arachidic acid, heneicosylic acid, behenic acid, tricosylic acid, lignoceric acid, pentacosylic acid, and cerotic acid.

Examples of unsaturated fatty acids, i.e., fatty acids in which there are one or more double bonds between the carbon atoms in the alkyl chain, contemplated for use in the present invention include, but are not limited to, α-linolenic acid, stearidonic acid, eicosapentaenoic acid, docosahexaenoic acid, linoleic acid, γ-linolenic acid, dihomo-γ-linolenic acid, arachidonic acid, docosatetraenoic acid, palmitoleic acid, vaccenic acid, paullinic acid, oleic acid, elaidic acid, gondoic acid, erucic acid, nervonic acid, and mead acid.

The synthesis of the fatty acid (meth)acrylic acid salts of the present invention also involves the use of (meth)acrylic acid monomers. In this aspect of the present invention, suitable monomers include, for example, acrylic acid and methacrylic acid.

The present invention also contemplates the use of metal oxides, hydroxides, or carbonates, i.e., $M(OH)_x$, $M_xO_y$, and $M_x(CO_3)_y$, respectively, where x and y independently may range from about 1 to about 7. By the term "oxide", it is meant a chemical compound having an anion of oxygen. By the term, "hydroxide," it is meant a diatomic anion with the chemical formula OH—. By the term "carbonate," it is meant a compound containing a $CO_3$ moiety. Suitable metal cations (M) include, but are not limited to, sodium, magnesium, manganese, iron, calcium, chromium, copper, lithium, zinc, cadmium, aluminum, barium, tin, nickel, zirconium, titanium, vanadium, cobalt, nickel, scandium, and potassium. In one embodiment, the metal cations are zinc, magnesium, or cadmium.

For example, suitable metal oxides for use with the present invention include, but are not limited to, sodium oxide ($Na_2O$), potassium oxide ($K_2O$), ferrous oxide (FeO), magnesium oxide (MgO), manganese oxide ($MnO_2$), calcium oxide (CaO), chromium oxide ($Cr_2O_3$), copper oxide ($Cu_2O$), zinc oxide (ZnO), cadmium oxide (CdO), and combinations thereof. In one embodiment, the metal oxides for use in preparing the fatty acid (meth)acrylic acid salt reaction product are selected from magnesium oxide (MgO), zinc oxide (ZnO), cadmium oxide (CdO), and combinations thereof.

Suitable metallic carbonates for use with the present invention include, but are not limited to, sodium carbonate ($Na_2CO_3$), potassium carbonate ($K_2CO_3$), magnesium carbonate ($MgCO_3$), calcium carbonate ($CaCO_3$), copper carbonate ($Cu_2(OH)_2CO_3$), zinc carbonate ($ZnCO_3$), and combinations thereof.

The fatty acid (meth)acrylic acid salts of the present invention can be prepared by any suitable method available to one of ordinary skill in the art. In one embodiment, a fatty acid, a (meth)acrylic acid monomer, and a metal oxide or hydroxide are reacted to form a fatty acid (meth)acrylic acid salt. In this aspect, the general reaction scheme for preparing a fatty acid (meth)acrylic acid salt is shown below:

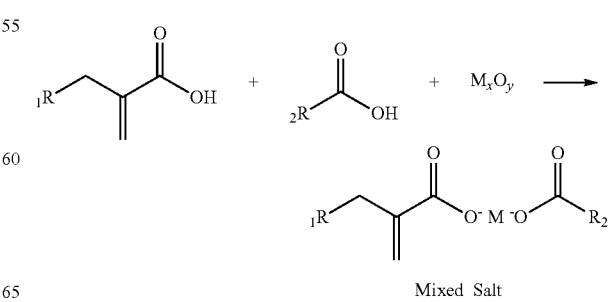

Mixed Salt where R is a straight or branched, saturated or unsaturated, carbon chain having at least 3 carbon atoms and M is the metal cation. X and Y independently may range from about 1 to about 7. The fatty acid (meth)acrylic acid salts of the present invention include any reaction product of the above-described reaction scheme.

The fatty acid (meth)acrylic acid salt of the present invention may be added to one or more portions of a golf ball. For example, the fatty acid (meth)acrylic acid salt may be added to a core layer including polybutadiene rubber, or the fatty acid (meth)acrylic acid salt may be added to a core or cover layer including a thermoplastic ionomer. The fatty acid (meth)acrylic acid salt may also be added to a layer formulation including both polybutadiene rubber and a thermoplastic ionomer.

In this aspect of the invention, the fatty acid (meth)acrylic acid salt of the present invention is added to a composition in an amount of about 1 parts per hundred ("phr") to about 50 phr. In one embodiment, the fatty acid (meth)acrylic acid salt is added to the composition in amount of about 2 phr to about 25 phr. In still another embodiment, the fatty acid (meth)acrylic acid salt is added to the composition in amount of about 5 phr to about 20 phr. In yet another embodiment, the fatty acid (meth)acrylic acid salt is added to the golf composition in an amount of about 25 phr to about 45 phr.

Blend with Polybutadiene Rubber Composition

In one embodiment, the fatty acid (meth)acrylic acid salt of the present invention may be added to a polybutadiene rubber composition. For example, the fatty acid (meth)acrylic acid salt may be added to a composition of polybutadiene rubber and then used to form a core of a golf ball. In this aspect of the invention, the golf ball layer includes a blend of the fatty acid (meth)acrylic acid salt of the present invention and a polybutadiene rubber material.

As it is known in the art, polybutadiene is a homopolymer of 1,3-butadiene. Polybutadiene is formed when the double bonds in the 1,3-butadiene monomer are attacked by catalysts to grow the polymer chain and form a polybutadiene polymer having a desired molecular weight. Any suitable catalyst may be used to synthesize the polybutadiene rubber depending upon the desired properties. Generally, a transition metal complex (for example, neodymium, nickel, or cobalt) or an alkyl metal such as alkyllithium is used as a catalyst. Other catalysts include, but are not limited to, aluminum, boron, lithium, titanium, and combinations thereof. The catalysts produce polybutadiene rubbers having different chemical structures. The polybutadiene rubber can have various combinations of cis- and trans-bond structures. A preferred polybutadiene rubber has a 1,4 cis-bond content of at least 40 percent, preferably greater than 80 percent, and more preferably greater than 90 percent.

The polybutadiene rubber (base rubber) may be blended with other elastomers in accordance with this invention. Other elastomers include, but are not limited to, polyisoprene, ethylene propylene rubber ("EPR"), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated, isoprene rubber, and combinations of two or more thereof.

Examples of commercially available polybutadiene rubbers that can be used in accordance with this invention, include, but are not limited to, BR 01 and BR 1220, available from BST Elastomers of Bangkok, Thailand; SE BR 1220LA and SE BR1203, available from The Dow Chemical Co. of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh, Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEOCIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; DIENE 55NF, 70AC, and 320 AC, available from Firestone Polymers of Akron, Ohio; and PBR-Nd Group II and Group III, available from Nizhnekamskneftekhim, Inc. of Nizhnekamsk, Tartarstan Republic.

The polybutadiene rubber composition may be cured, either pre-blending or post-blending, using a conventional curing process. Suitable curing processes include, for example, peroxide-curing, sulfur-curing, high-energy radiation, and combinations thereof. In this aspect, of the invention, the rubber composition includes a crosslinking initiator. The crosslinking initiator is used to promote the crosslink reaction between a reactive coagent and the polybutadiene rubber. The crosslinking initiators suitable for use with the present invention may be any known polymerization initiators that produce free radicals during the curing cycle. Suitable initiators include, but are not limited to, peroxides, high energy radiation sources capable of generating free radicals, and combinations thereof.

Suitable high energy radiation sources capable of generating free radicals include, but are not limited to, electron beams, ultra-violet radiation, gamma radiation, X-ray radiation, infrared radiation, heat, and combinations thereof. In one embodiment, a photoinitiator is used in conjunction with an ultra-violet radiation cure.

Suitable peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; lauryl peroxide; benzoyl peroxide; and combinations thereof. In addition to peroxides, other free radical initiators suitable for use with the present invention include persulfates, azo compounds, benzophenones, hydrazides, and combinations thereof.

The crosslinking initiator may be present in the composition of the present invention in an amount ranging between about 0.05 phr and about 15 phr by weight of the composition. For example, in one embodiment, the amount of initiator is about 5 phr or less, preferably about 3 phr or less, more preferably about 2.5 phr or less, and even more preferably about 2 phr or less per hundred of the composition. In still another embodiment, the amount of free radical initiator is between about 0.1 phr and about 1.5 phr, more preferably between about 0.25 phr and about 0.5 phr. Those of ordinary skill in the art will understand that the total amount of initiators used will vary depending on the specific end product desired and the particular initiators employed.

The polybutadiene rubber composition further includes a reactive coagent. The reactive coagent crosslinks, i.e., vulcanizes, the polybutadiene rubber. In one embodiment, the coagent is the fatty (mono)methacrylate of the present invention. In another embodiment, the coagent includes the fatty (mono)methacrylate of the present invention in combination with a conventional coagent. Suitable conventional coagents include, but are not limited to, metal salts of unsaturated carboxylic acids having from 3 to 8 carbon atoms: unsaturated vinyl compounds and polyfunctional monomers (e.g., trimethylolpropane trimethacrylate); phenylene bismaleimide; zinc oxide; fatty acids, such as stearic, behenic, erucic, oleic, linoleic; fatty acid salts, such as zinc stearate; and combinations thereof. Examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In one embodiment, the coagent is selected from zinc salts of acrylates, diacrylates, methacrylates, and dimethacrylates. In another embodiment, the agent is zinc diacrylate ("ZDA").

The amount of coagent used in the rubber composition may vary depending on the desired hardness of the core. The rubber composition includes the coagent in an amount ranging from about 1 to about 60 phr by weight. In one embodiment, the coagent is used in an amount of about 5 to about 55 phr by weight. In another embodiment, the coagent is used in an amount of about 10 to about 45 phr by weight. In yet another embodiment, the coagent is used in an amount of about 15 to about 40 phr by weight. In still another embodiment, the coagent is used in an amount of about 20 to about 30 phr by weight.

When the polybutadiene rubber forms a blend with the fatty acid (meth)acrylic acid salt, the polybutadiene rubber is used in an amount of about 100 phr, while the fatty acid (meth)acrylic acid salt is used in an amount of about 1 phr to about 70 phr, preferably about 10 phr to about 50 phr. For example, the weight percentage ratio of polybutadiene rubber to fatty acid (meth)acrylic acid salt in the golf ball layer is about 100:1 to about 1.42:1.

Blend with Ionomeric Composition

In another embodiment, the fatty acid (meth)acrylic acid salt of the present invention may be added to an ionomeric thermoplastic composition. In this aspect of the invention, a resulting golf ball layer formed from the blend of the fatty acid (meth)acrylic acid salt of the present invention and an ionomer resin may form an intermediate layer or cover layer of a golf ball.

Suitable ionomer resins contemplated by the present invention include, for example, copolymers of an α-olefin and a $C_{3-8}$ α, β-ethylenically unsaturated carboxylic acid, optionally including a softening monomer. The acid copolymers may be described as E/X/Y copolymers. E is an alkylene. In one embodiment, E is ethylene or propylene, preferably ethylene. X is a α,β-ethylenically unsaturated carboxylic acid. The acid is preferably selected from (meth) acrylic acid, ethacrylic acid, maleic acid, crotonic acid, fumaric acid, and itaconic acid. As used herein, the term "(meth)acrylic" includes both methacrylic and acrylic. In one embodiment, the acid is (meth)acrylic acid. Y is a softening comonomer. In one embodiment, Y is alkyl acrylate, methacrylate, or a combination thereof, where the alkyl groups have from 1 to 8 carbon atoms.

The acid polymers of the present invention may include the α-olefin (E) in an amount of about 40 weight percent or greater, preferably about 60 weight percent or greater, more preferably about 70 weight percent or greater, and even more preferably about 90 weight percent or greater, based on the total weight of the acid polymer. The acid polymers of the present invention may include the carboxylic acid (X) in an amount from about 1 to about 40 weight percent, preferably about 5 to about 30 weight percent, and more preferably about 10 to about 20 weight percent, based on the total weight of the acid polymer. If included, the softening monomer (Y) may be present in the acid polymer in an amount from about 0 to about 50 weight percent, preferably from about 5 to about 25 weight percent, and more preferably from about 10 to about 20 weight percent, based on the total weight of the acid polymer.

Suitable acid copolymers include, but are not limited to, those wherein the α-olefin (E) is ethylene, the acid (X) is (meth)acrylic acid, and the optional softening monomer (Y) is methacrylate, n-butyl (meth)acrylate, isobutyl (meth)acrylate, methyl (meth)acrylate, or ethyl (meth)acrylate. In one embodiment, the acid polymers are selected from ethylene/ (meth)acrylic acid/n-butyl acrylate, ethylene/(meth)acrylic acid/methyl acrylate, ethylene/(meth)acrylic acid/ethyl acrylate, ethylene/(meth)acrylic acid/isobutyl acrylate, and combinations thereof.

The acidic groups in the copolymeric ionomers may be partially or totally neutralized with a cation source. Neutralization may occur either pre-blending or post-blending. For example, in one embodiment, a partially or fully neutralized ionomer is added to the blend. In another embodiment, a lowly or non-neutralized ionomer may be first blended with the fatty acid (meth)acrylic acid salt in accordance with this invention, followed by neutralization in-situ with a cation source.

Suitable cation sources include metal cations and salts thereof, organic amine compounds, ammonium, and combinations thereof. Preferred cation sources are metal cations and salts thereof, wherein the metal is preferably lithium, sodium, potassium, magnesium, calcium, barium, lead, tin, zinc, aluminum, manganese, nickel, chromium, copper, or a combination thereof. The amount of cation used in the composition is readily determined based on desired level of neutralization. For example, the present invention contemplates the use of ionomeric resins having acid groups that are neutralized from about 10 percent to about 100 percent. In one embodiment, the acid groups are partially neutralized. That is, the neutralization level is from about 10 percent to about 80 percent, more preferably 20 percent to 70 percent, and most preferably 30 percent to 50 percent. In another embodiment, the acid groups are highly or fully neutralized. That is, the neutralization level is from about 80 percent to about 100 percent, more preferably 90 percent to 100 percent, and most preferably 95 percent to 100 percent.

In one embodiment of the present invention, the resulting blend of the fatty acid (meth)acrylic acid salt and the ionomer resin may be crosslinked. While the thermoplastic ionomer resin remains essentially not-crosslinked, a crosslinking initiator may be added to the blend to cure the acrylate functionality of the fatty acid (meth)acrylic acid salt. The crosslinking initiators suitable for use with this aspect of the invention include any of the crosslinking initiators listed above with regard to the polybutadiene layer. Without being bound to any particular theory, it is believed that the peroxide or other crosslinking initiator added to the blend may also react with polyethylenic radicals from the ionomer. The radicals may be the result of chain scission or any other mechanism that cleaves carbon-carbon bonds and creates radicals that may react with the acrylate functionality of the fatty acid (meth)acrylic acid salt. By curing the acrylate functionality, improvements in physical properties such as hardness, toughness, durability, and resilience are realized.

When the fatty acid (meth)acrylic acid salt of the present invention and the ionomer resin are blended, the ionomer is used in an amount of about 50 weight percent to about 99 weight percent, while the fatty acid (meth)acrylic acid salt is used in an amount of about 1 weight percent to about 50 weight percent, preferably about 10 weight percent to about 40 weight percent. For example, the weight percentage ratio of ionomer to fatty acid (meth)acrylic acid salt in the golf ball layer is about 99:1 to about 1:1.

Blend with Polybutadiene Rubber & Ionomer

In yet another embodiment, the fatty acid (meth)acrylic acid salt of the present invention is added to a composition including both a polybutadiene rubber or a polybutadiene based composition and an ionomer. The golf ball layer formed from such a composition may represent a core, an intermediate layer, or a cover layer. In this aspect, the golf ball layer includes a blend of the fatty acid (meth)acrylic acid salt of the present invention, a polybutadiene rubber material, and an ionomer resin. Any of the fatty acid (meth)acrylic acid salts, polybutadiene rubber materials, and ionomers discussed above may be used in accordance with this aspect of the invention.

When the fatty acid (meth)acrylic acid salt of the present invention, polybutadiene rubber material, and ionomer resin are blended, the polybutadiene resin is used in an amount of about 5 weight percent to about 90 weight percent, the ionomer is used in an amount of about 5 weight percent to about 90 weight percent, and the fatty acid (meth)acrylic acid salt is used in an amount of about 1 weight percent to about 50 weight percent, preferably about 10 weight percent to about 40 weight percent.

Melt Flow Modifiers

The blends of the present invention optionally contain one or more melt flow modifiers. The amount of melt flow modifier in the composition is readily determined such that the melt flow index of the composition is at least 0.1 g/10 min, preferably from 0.5 g/10 min to 10.0 g/10 min, and more preferably from 1.0 g/10 min to 6.0 g/10 min, as measured using ASTM D-1238, condition E, at 190° C., using a 2160 gram weight.

Suitable melt flow modifiers include, but are not limited to, the high molecular weight organic acids and salts thereof disclosed above, polyamides, polyesters, polyacrylates, polyurethanes, polyethers, polyureas, polyhydric alcohols, and combinations thereof. Also suitable are the non-fatty acid melt flow modifiers.

Additives/Fillers

The blends of the present invention also optionally include additives, fillers, and combinations thereof. In one embodiment, the additives and/or fillers may be present in an amount of from 0 weight percent to about 50 weight percent, based on the total weight of the blend. In another embodiment, the additives and/or fillers may be present in an amount of from about 5 weight percent to about 30 weight percent, based on the total weight of the blend. In still another embodiment, the additives and/or fillers may be present in an amount of from about 10 weight percent to about 20 weight percent, based on the total weight of the blend.

Suitable additives and fillers include, but are not limited to, chemical blowing and foaming agents, optical brighteners, coloring agents, fluorescent agents, whitening agents, UV absorbers, light stabilizers, defoaming agents, processing aids, mica, talc, nano-fillers, antioxidants, stabilizers, softening agents, fragrance components, plasticizers, impact modifiers, $TiO_2$, acid copolymer wax, surfactants, and fillers, such as zinc oxide, tin oxide, barium sulfate, zinc sulfate, calcium oxide, calcium carbonate, zinc carbonate, barium carbonate, clay, tungsten, tungsten carbide, silica, lead silicate, regrind (recycled material), and mixtures thereof.

Methods of Making

The materials used in forming a composition in accordance with the invention, for example, the fatty acid (meth)acrylic acid salt, polybutadiene rubber, and ionomeric resin, may be blended by any type of mixing known to one of ordinary skill in the art. Suitable types of mixing include single pass and multi-pass mixing. Suitable mixing equipment is well known to those of ordinary skill in the art, and such equipment may include a Banbury mixer, a two-roll mill, or a twin screw extruder. Conventional mixing speeds for combining polymers are typically used. The mixing temperature depends upon the type of polymer components, and more importantly, on the type of crosslinking initiator. Suitable mixing speeds and temperatures are well known to those of ordinary skill in the art, or may be readily determined without undue experimentation.

When the blends of the present invention are used in a core or intermediate layer, the blend can be subjected to a compression or injection molding process to obtain solid spheres for the center or hemispherical shells for forming an intermediate layer. The temperature and duration of the molding cycle are selected based upon reactivity of the mixture. The molding cycle may have a single step of molding the mixture at a single temperature for a fixed duration of time. The molding cycle may also include a two-step process, in which the polymer mixture is held in the mold at an initial temperature for an initial duration of time, followed by holding at a second, typically higher temperature, for a second duration of time. Preferably a single-step cure cycle is employed. Although the curing time depends on the various materials selected, those of ordinary skill in the art will be readily able to adjust the curing time upward or downward based on the particular materials used and the discussion herein.

When the blends of the present invention are used in a cover layer, the blend can be subjected to injection molding, compression molding, casting, vacuum forming, powder coating, and the like. After the cover is formed, a dimple pattern may be applied to the outermost surface of the cover layer.

Golf Ball Construction

As discussed briefly above, the present invention may be used with any type of ball construction including, but not limited to, one-piece, two-piece, three-piece, and four-piece designs, a double core, a double cover, an intermediate layer(s), a multilayer core, and/or a multi-layer cover depending on the type of performance desired of the ball. That is, the present invention may be used in a core, an intermediate layer, and/or a cover of a golf ball, each of which may have a single layer or multiple layers.

Golf Ball Core Layer(s)

The core or core layer(s) may be formed from the blends of the invention, for example, the blend of fatty acid (meth)acrylic acid salt and polybutadiene rubber. As shown in FIG. 1, a suitable golf ball 10 constructed according to the invention may have a core 12 (formed of a composition of the invention) and a cover 14 formal from a castable composition, a thermoset composition, a compression moldable composition, an injection moldable composition, or any of the other cover materials discussed below.

The core may have a diameter of about 1.0 inches to about 1.64 inches and the cover layer thickness may range from about 0.03 inches to about 0.06 inches.

The core compression may be about 90 or less, or 80 or less, or 70 or less, or 60 or less, or 50 or less, or 40 or less, or 30 or less, or 20 or less, or a compression within a range having a lower limit of 10 or 20 or 30 or 35 or 40 and an upper limit of 50 or 60 or 70 or 80 or 90. In another embodiment, the core may have an overall compression of 40 or greater, or 50 or greater, or 60 or greater, or 70 or greater, or 80 or greater, or a compression within a range having a lower limit of 40 or 50 or 55 or 60 and an upper limit of 80.

The coefficient of restitution ("COR") of a golf ball core made according to the invention may be at least about 0.600 at 125 ft/s. In one embodiment, the COR is at least about 0.750, at least about 0.780, at least about 0.782, at least about 0.785, at least about 0.787, at least about 0.790, at least about 0.795, at least about 0.798, at least about 0.800, or at least about 0.830 or higher.

When not formed from the blends of the invention, any core material known to one of ordinary skill in that art is suitable for use in the golf balls of the invention. In particular, the core may be solid, semi-solid, hollow, fluid-filled or powder-filled, one-piece or multi-component cores. As used herein, the term "fluid" includes a liquid, a paste, a gel, a gas, or any combination thereof; the term "fluid-filled" includes hollow centers or cores; and the term "semi-solid" refers to a paste, a gel, or the like. Suitable core materials include thermoset materials, such as rubber, styrene butadiene, polybutadiene, isoprene, polyisoprene, trans-isoprene, as well as thermoplastics such as ionomer resins, polyamides or polyesters, and thermoplastic and thermoset polyurethane elastomers, in addition, the blends of the invention may be incorporated into the core.

Golf Ball Intermediate Layer(s)

Figure 2:
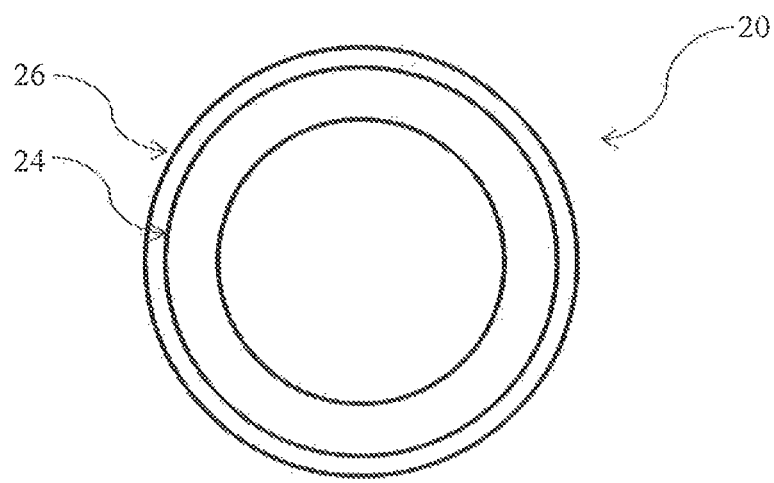
FIG. 2 illustrates a cross-section of a multi-piece golf ball in accordance with an embodiment of the invention.

An intermediate layer, such as an outer core layer or inner cover layer, i.e., any layer(s) disposed between the inner core and the outer cover of a golf ball may be formed from the blends of the present invention. An intermediate layer may be used, if desired, with a multilayer cover or a multilayer core, or with both a multilayer cover and a multilayer core. As with the core, the intermediate layer may also include a plurality of layers. FIG. 2 illustrates a golf ball 20 formed according to one embodiment of the invention where the core 22 and the cover 26 surround an intermediate layer 24, which is formed from a composition of the invention. Alternatively, either of the core 22 or cover 26 may be formed from a composition of the invention and the intermediate layer 24 may be formed from any of the intermediate layer materials discussed below.

For example, an intermediate layer or inner cover layer having a thickness of about 0.015 inches to about 0.06 inches may be disposed about a core. In this aspect of the invention, the core, which has a diameter ranging from about 1.5 inches to about 1.59 inches, may also be formed from the blends of the invention or, in the alternative, from a conventional rubber composition. The inner ball may be covered by a castable thermoset or injection moldable thermoplastic material or any of the other cover materials discussed below. In this aspect of the invention, the cover may have a thickness of about 0.02 inches to about 0.045 inches, preferably about 0.025 inches to about 0.04 inches.

In another embodiment, the intermediate layer is covered by an inner cover layer, either of which may independently be formed from the blends of the invention or other material that produces the desired performance results. For example, a ball of the invention may include a center having a diameter of about 0.5 inches to about 1.30 inches. The center may be formed from a blend of the invention or any of the other core materials previously discussed. The core may be covered by an outer core layer to form a core, which also may be formed from the blends of the invention, any of the core materials discussed above, or castable thermoset materials or injection moldable thermoplastic materials. The outer core layer may have a thickness of about 0.125 inches to about 0.500 inches. The core may then be covered with a easing layer having a thickness of about 0.015 inches to about 0.06 inches formed from a blend of the invention, a castable thermoset material or an injection moldable thermoplastic material. The outer cover layer, which preferably has a thickness of about 0.02 inches to about 0.045 inches, may be formed from a castable thermoset material or an injection moldable thermoplastic material or other suitable cover materials discussed below and known in the art.

When not formed from the blends of the invention, the intermediate layer(s) may also be formed, at least in part, from one or more homopolymeric or copolymeric materials, such as ionomers, primarily or fully non-ionomeric thermoplastic materials, vinyl resins, polyolefins, polyurethanes, polyureas, polyamides, acrylic resins and blends thereof olefinic thermoplastic rubbers, block copolymers of styrene and butadiene, isoprene or ethylene-butylene rubber, copoly (ether-amide), polyphenylene oxide resins or blends thereof, and thermoplastic polyesters.

Golf Ball Cover Layer(s)

Properties that are desirable for the cover are good moldability, high moisture resistance, high abrasion resistance, high impact resistance, high tear strength, high resilience, and good mold release, among others. The cover layer may be formed, at least in part, from the blends of the invention, for example, the blend of a fatty(mono)methacrylate and an ionomer. However, when not formed from the blends of the invention, the cover may be formed from, one or more homopolymeric or copolymeric materials as discussed in the section above pertaining to the intermediate layer. Golf balls according to the invention may also be formed having a cover of polyurethane, polyurea, and polybutadiene materials. For example, the golf ball 10 in FIG. 1 may represent a two-piece ball having a cover 14 may be formed of a blend of the invention and a core 12 formed of a conventional core material, such as any of the materials listed above. Similarly, the golf ball 20 in FIG. 2 may represent a multi-piece ball having a cover 26 formed of a blend of the invention disposed over and an inner ball formed from core 22 and intermediate layer 24.

In one embodiment, the cover may have a thickness of about 0.02 Inches or greater. In another embodiment, the cover may be about 0.03 inches or greater in thickness. In still another embodiment, the thickness of the cover may range from about 0.02 inches to about 0.05 inches.

Golf Ball Post-Processing

The golf balls of the present invention may be painted, coated, or surface treated for further benefits. For example, golf balls may be coated with urethanes, urethane hybrids, ureas, urea hybrids, epoxies, polyesters, acrylics, or combinations thereof in order to obtain an extremely smooth, tack-free surface. If desired, more than one coating layer can be used. The coating layer(s) may be applied by any suitable method known to those of ordinary skill in the art. Any of the golf ball layers may be surface treated by conventional methods including blasting, mechanical abrasion, corona discharge, plasma treatment, and the like, and combinations thereof.

Golf Ball Properties

The properties such as core diameter, intermediate layer and cover layer thickness, hardness, and compression have been found to affect play characteristics such as spin, initial velocity, and feel of the present golf balls.

Component Dimensions

Dimensions of golf ball components, i.e., thickness and diameter, may vary depending on the desired properties. For the purposes of the invention, any layer thickness may be employed. For example, the present invention relates to golf balls of any size, although the golf ball preferably meets USGA standards of size and weight.

The preferred diameter of the golf balls is from about 1.680 inches to about 1.800 inches, more preferably from about 1.680 inches to about 1.760 inches. A diameter of from about 1.680 inches (43 mm) to about 1.740 inches (44 mm) is most preferred; however diameters anywhere in the range of from 1.700 to about 1.950 inches can be used.

Preferably, the overall diameter of the core and all intermediate layers is about 80 percent to about 98 percent of the overall diameter of the finished ball. The core may have a diameter ranging from about 0.09 inches to about 1.65 inches. In one embodiment, the diameter of the core of the present invention is about 1.2 inches to about 1.630 inches. For example, when part of a two-piece ball according to invention, the core may have a diameter ranging from about 1.5 inches to about 1.62 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches, preferably about 1.55 inches to about 1.60 inches.

If the core has multiple layers, such multi-layer cores of the present invention have an overall diameter within a range having a lower limit of about 1.0 or about 1.3 or about 1.4 or about 1.5 or about 1.6 or about 1.61 inches and an upper limit of about 1.62 inches or about 1.63 inches or about 1.64 inches. In a particular embodiment, the multi-layer core has an overall diameter of about 1.5 inches or about 1.51 inches or about 1.53 inches or about 1.55 inches or about 1.57 inches or about 1.58 inches or about 1.59 inches or about 1.6 inches or about 1.61 inches or about 1.62 inches.

The inner core has an overall diameter of about 0.5 inches or greater, or about 0.75 inches or greater, or about 0.8 inches or greater, or about 0.9 inches or greater, or about 1.0 inches or greater, or about 1.150 inches or greater, or about 1.25 inches or greater, or about 1.35 inches or greater, or about 1.39 inches or greater, or about 1.45 inches or greater, or an overall diameter within a range having a lower limit of about 0.25 or about 0.5 or about 0.75 or about 0.8 or about 0.9 or about 1.0 or about 1.1 or about 1.15 or about 1.2 inches and an upper limit of about 1.25 or about 1.3 or about 1.35 or about 1.39 or about 1.4 or about 1.44 or about 1.45 or about 1.46 or about 1.49 or about 1.5 or about 1.55 or about 1.58 or about 1.6 inches.

Each optional intermediate core layer may have an overall thickness within a range having a lower limit of about 0.005 inches to about 0.040 Inches and an upper limit of about 0.05 inches to about 0.100 inches.

The cover typically has a thickness to provide sufficient strength, good performance characteristics, and durability. In one embodiment, the cover thickness is from about 0.02 inches to about 0.12 inches, preferably about 0.1 inches or less. For example, when part of a two-piece ball according to invention, the cover may have a thickness ranging from about 0.03 inches to about 0.09 inches. In another embodiment, the cover thickness is about 0.05 inches or less, preferably from about 0.02 inches to about 0.05 inches, and more preferably about 0.02 inches and about 0.045 inches.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the present invention, the intermediate layer, or inner cover layer, may have a thickness about 0.3 inches or less. In one embodiment, the thickness of the intermediate layer is from about 0.002 inches to about 0.1 inches, and preferably about 0.01 inches or greater. For example, when part of a three-piece ball or multi-layer ball according to the invention, the intermediate layer and/or inner cover layer may have a thickness ranging from about 0.015 inches to about 0.06 inches. In another embodiment, the intermediate layer thickness is about 0.05 inches or less, more preferably about 0.01 inches to about 0.045 inches.

Hardness

The blends of the invention may be used in any layer of a golf ball. Accordingly, the golf ball construction, physical properties, and resulting performance may vary depending on the layer(s) of the ball that include the blends of the invention.

The cores included in the golf balls of the present invention may have varying hardnesses depending on the particular golf ball construction. In one embodiment, the core hardness ranges from about 50 Shore C to about 65 Shore C. In another embodiment, the core has a hardness ranging from about 50 Shore C to about 95 Shore C. In yet another embodiment, the core has a hardness ranging from about 70 Shore C to about 85 Shore C.

The intermediate layers of the present invention may also vary in hardness depending on the specific construction of the ball. In one embodiment, the surface hardness of the intermediate layer may be about 70 Shore D or less, or about 65 Shore D or less, or less than about 65 Shore D, or a Shore D hardness of from about 50 to about 65, or a Shore D hardness of from about 55 to about 60.

As with the core and intermediate layers, the cover hardness may vary depending on the construction and desired characteristics of the golf ball. In one embodiment, the cover may have a surface hardness of about 60 Shore D or less and/or a material hardness of about 60 Shore D or less. In another embodiment, the cover is a dual- or multi-layer cover including an inner or intermediate cover layer and an outer cover layer formed. The inner layer may have a surface hardness of about 70 Shore D or less, or about 65 Shore D or less, or less than about 65 Shore D, or a Shore D hardness of from about 50 to 65, or a Shore D hardness of from about 55 to 60. The outer cover layer may have a surface hardness ranging from about 20 Shore D to about 75 Shore D.

Compression

Compression is an important factor in golf ball design. For example, the compression of the core can affect the ball's spin rate off the driver and the feel. In fact, the compositions and methods of the present invention result in golf balls having increased compressions and ultimately an overall harder ball. The harder the overall ball, the less deformed it becomes upon striking, and the faster it breaks away from the golf club.

As disclosed in Jeff Dalton's *Compression by Any Other Name, Science and Golf IV, Proceedings of the World Scientific Congress of Golf* (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, "compression" refers to Atti compression and is measured according to a known procedure, using an Atti compression test device, wherein a piston is used to compress a ball against a spring.

Golf balls of the present invention typically have a compression of 40 or greater, or a compression within a range having a lower limit of 50 or 60 and an upper limit of 100 or 120.

Coefficient of Restitution

The coefficient of restitution or COR of a golf ball is a measure of the amount of energy lost when two objects collide. The COR of a golf ball indicates its ability to rebound and accounts for the spring-like feel of the ball after striking. As used herein, the term "coefficient of restitution" (COR) is calculated by dividing the rebound velocity of the golf ball by the incoming velocity when a golf ball is shot out of an air cannon. The COR testing is conducted over a range of incoming velocities and determined at an inbound velocity of 125 ft/s.

The present invention contemplates golf balls having CORs from about 0.700 to about 0.850 or more at an inbound velocity of about 125 ft/sec. In one embodiment, the COR is about 0.750 or greater, preferably about 0.780 or greater. In another embodiment, the ball has a COR of about 0.800 or greater. In yet another embodiment, the COR of the balls of the invention is about 0.800 to about 0.815.

Solid spheres (1.55 inches) formed of the blends of the invention may have a COR of at least about 0.790, preferably at least about 0.800. For example, the COR of solid spheres formed from the blends of the invention ranges from about 0.810 to about 0.830. In one embodiment, the solid sphere has a COR of about 0.800 to about 0.825. In another embodiment, the COR of the solid sphere ranges from about 0.805 to about 0.815.

Moisture Vapor Transmission

The moisture vapor transmission of a golf ball portion formed from the blends of the invention may be expressed in terms of absorption, e.g., weight gain or size gain over a period of time at a specific conditions, and transmission, e.g., moisture vapor transmission rate (MVTR) according to ASTM E96-00. MVTR refers to the mass of water vapor that diffused into a material of a given thickness per unit area per unit time at a specific temperature and humidity differential. For example, weight changes of a golf ball portion monitored over a period of seven weeks in 100 percent relative humidity and 72° F., help to demonstrate which balls have better water resistance.

In one embodiment, the golf ball portions of the invention have a weight gain of about 0.15 grams or less after seven weeks. In another embodiment, the golf balls of the invention have a weight gain of about 0.13 grams or less after a seven-week storage period. In still another embodiment, the weight gain of the golf balls of the invention is about 0.09 grams or less after seven weeks. In yet another embodiment, the weight gain is about 0.06 grams or less after a seven-week period. The golf balls of the invention preferably have a weight gain of about 0.03 grams or less over a seven-week storage period.

Size gain may also be used as an indicator of water resistance. That is, the more water a golf ball takes on, the larger a golf ball becomes due to the water enclosed beneath the outermost layer of the golf ball portion. Thus, the golf balls of the invention preferably have no appreciable size gain. In one embodiment, the size gain of the golf balls of the invention after a seven-week period is about 0.001 inches or less.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

The invention described and claimed herein is not to be limited in scope by the specific embodiments herein disclosed, since these embodiments are intended as illustrations of several aspects of the invention. Any equivalent embodiments are intended to be within the scope of this invention. For example, the compositions of the invention may also be used in golf equipment such as putter inserts, golf club heads and portions thereof golf shoe portions, and golf bag portions. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporate herein by reference in their entirety.

What is claimed is:

1. A golf ball comprising a cover, a core, and an intermediate layer disposed between the cover and the core, wherein the core comprises:

a blend of a polybutadiene rubber and a fatty acid (meth) acrylic acid salt, wherein the fatty acid (meth) acrylic acid salt comprises the reaction product of a fatty acid, a (meth)acrylic acid monomer, and $M(OH)_x$ or $M_xO_y$, where M is a metal cation and x and y independently range from about 1 to about 7, and wherein the fatty acid (meth)acrylic acid salt is present in the blend in an amount of about 1 phr to about 70 phr.

2. The golf ball of claim 1, wherein the fatty acid (meth)acrylic acid salt comprises stearic acid or oleic acid.

3. The golf ball of claim 1, wherein the blend further comprises a coagent selected from zinc diacrylate, zinc oxide, a fatty acid, a fatty acid salt, or combinations thereof.

4. The golf ball of claim 1, wherein the fatty acid (meth)acrylic acid salt is present in the blend in an amount of about 10 phr to about 50 phr.

5. The golf ball of claim 1, wherein the core has a hardness of about 70 Shore C to about 85 Shore C.

6. The golf ball of claim 1, wherein the fatty acid comprises at least 4 carbon atoms.

7. A golf ball comprising a core, a cover, and an intermediate layer disposed between the core and the cover, wherein the core comprises:

a blend of a polybutadiene rubber and a fatty acid (meth) acrylic acid salt, wherein the fatty acid (meth)acrylic acid salt comprises the reaction product of a fatty acid having the following formula:

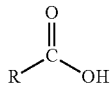

where R is a straight or branched, saturated or unsaturated, carbon chain having at least 3 carbon atoms, a (meth)acrylic acid monomer, and a metal component having the formula $M(OH)_x$ or $M_xO_y$, where M is a metal cation and x and y independently range from about 1 to about 7, and wherein the fatty acid (meth)acrylic acid salt is present in the blend in an amount of about 10 phr to about 50 phr.

8. The golf ball of claim 7, wherein the fatty acid is saturated.

9. The golf ball of claim 7, wherein the (meth)acrylic acid monomer comprises acrylic acid or methacrylic acid.

10. The golf ball of claim 7, wherein M comprises zinc, magnesium, or cadmium.

11. The golf ball of claim 7, wherein the metal component is selected from the group consisting of magnesium oxide (MgO), zinc oxide (ZnO), cadmium oxide (CdO), and combinations thereof.

12. The golf ball of claim 7, wherein the blend further comprises a crosslinking initiator selected from the group consisting of peroxides, high energy radiation sources capable of generating free radicals, or combinations thereof.

13. The golf ball of claim 7, wherein the fatty acid comprises stearic acid or oleic acid.

14. The golf ball of claim 7, wherein the blend further comprises a coagent selected from the group consisting of zinc salts of acrylates, diacrylates, methacrylates, and dimethacrylates.

15. A golf ball comprising a core, an intermediate layer disposed about the core, and a cover disposed about the intermediate layer, wherein the core comprises:
a blend of a polybutadiene rubber, a fatty acid (meth) acrylic acid salt in an amount of about 1 phr to about 70 phr, and a crosslinking initiator, wherein the fatty acid (meth)acrylic acid salt comprises the reaction product of a fatty acid, a (meth)acrylic acid monomer, and a metal oxide or metal hydroxide.

16. The golf ball of claim 15, wherein the fatty acid (meth)acrylic acid salt is present in the blend in an amount of about 10 phr to about 50 phr.

17. The golf ball of claim 15, wherein the crosslinking initiator is selected from the group consisting of peroxides, high energy radiation sources capable of generating free radicals, and combinations thereof.

18. The golf ball of claim 15, wherein the blend further comprises a coagent selected from the group consisting of zinc diacrylate, zinc oxide, a fatty acid, a fatty acid salt, and combinations thereof, wherein the coagent is present in an amount of about 5 phr to about 55 phr.

19. The golf ball of claim 15, wherein the (meth)acrylic acid monomer comprises acrylic acid or methacrylic acid.

20. The golf ball of claim 15, wherein the blend comprises a metal oxide selected from the group consisting of magnesium oxide (MgO), zinc oxide (ZnO), cadmium oxide (CdO), and combinations thereof.

* * * * *